March 11, 1958     F. H. SCHWARTZ     2,826,373
INTERMITTENT MOTION MECHANISM

Filed July 5, 1955     10 Sheets-Sheet 1

INVENTOR
FRANCIS H. SCHWARTZ
BY
ATTORNEY

March 11, 1958     F. H. SCHWARTZ     2,826,373
INTERMITTENT MOTION MECHANISM
Filed July 5, 1955     10 Sheets-Sheet 2

INVENTOR
FRANCIS H. SCHWARTZ.
BY
ATTORNEY

INVENTOR
FRANCIS H. SCHWARTZ
BY
ATTORNEY

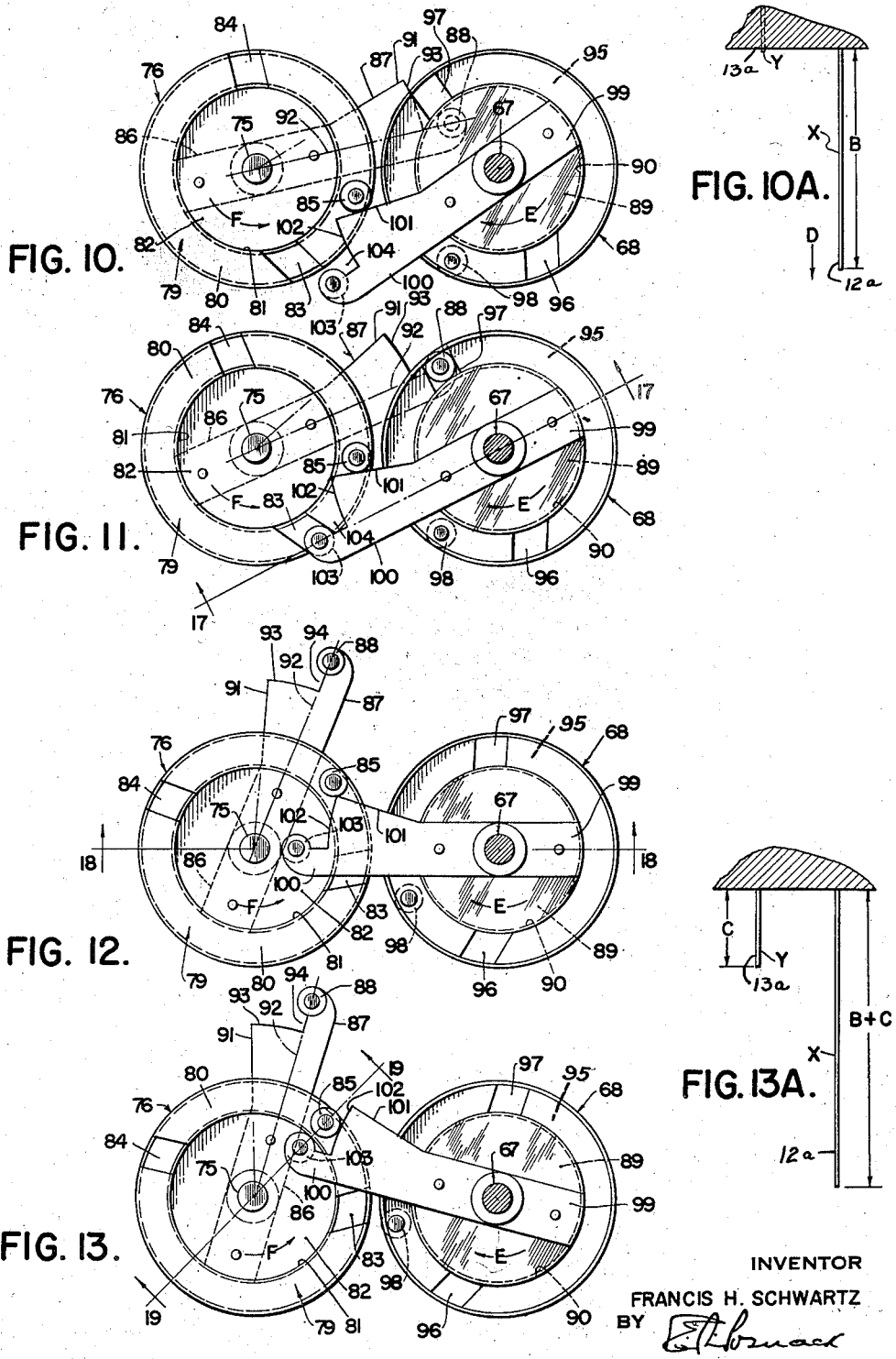

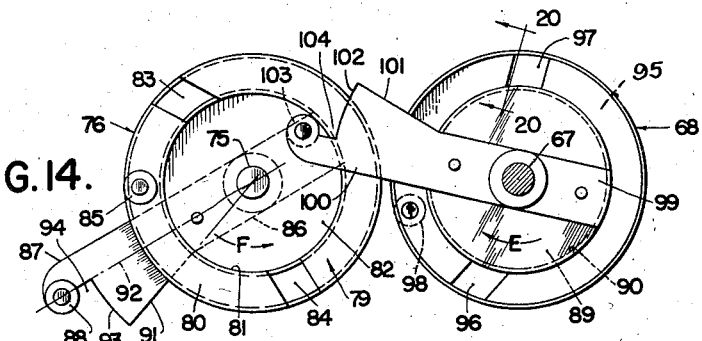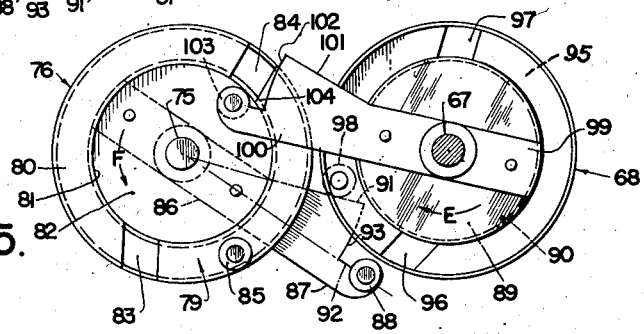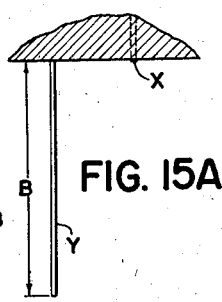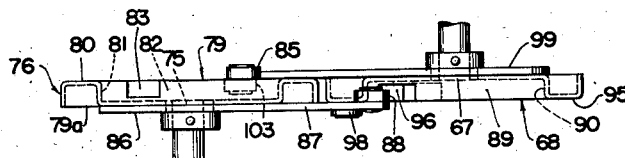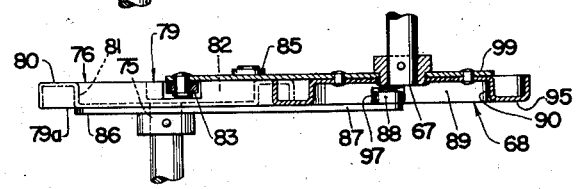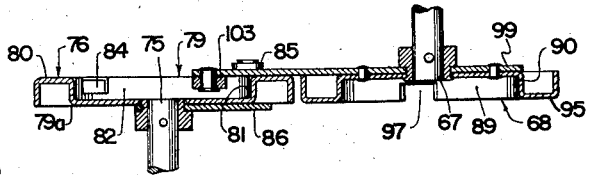

March 11, 1958 F. H. SCHWARTZ 2,826,373
INTERMITTENT MOTION MECHANISM
Filed July 5, 1955 10 Sheets-Sheet 6

INVENTOR
FRANCIS H. SCHWARTZ
BY
ATTORNEY

March 11, 1958   F. H. SCHWARTZ   2,826,373
INTERMITTENT MOTION MECHANISM
Filed July 5, 1955   10 Sheets-Sheet 8
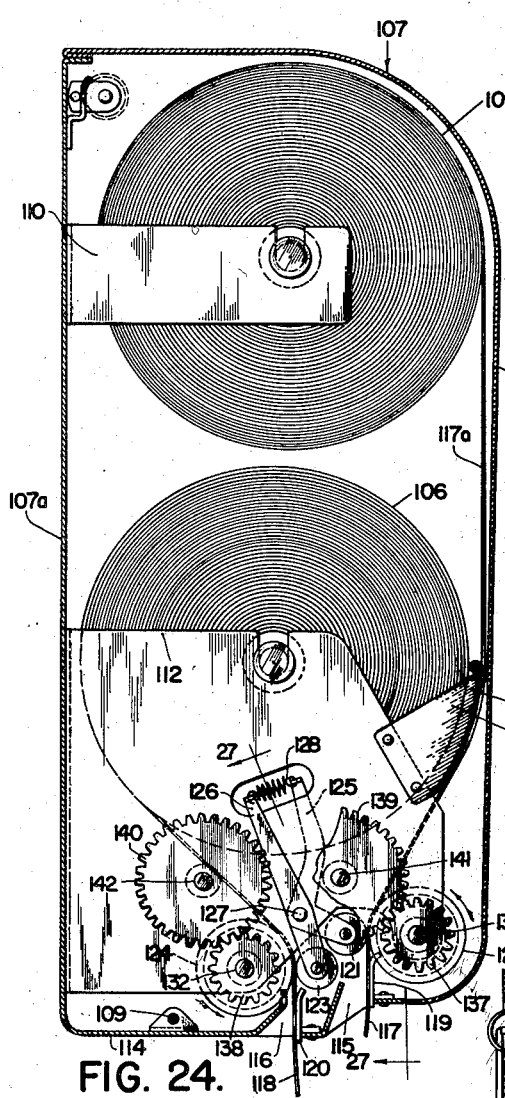
INVENTOR
FRANCIS H. SCHWARTZ
BY
ATTORNEY March 11, 1958     F. H. SCHWARTZ     2,826,373
INTERMITTENT MOTION MECHANISM
Filed July 5, 1955     10 Sheets-Sheet 9

INVENTOR
FRANCIS H. SCHWARTZ.
BY
ATTORNEY

March 11, 1958  F. H. SCHWARTZ  2,826,373
INTERMITTENT MOTION MECHANISM
Filed July 5, 1955  10 Sheets-Sheet 10
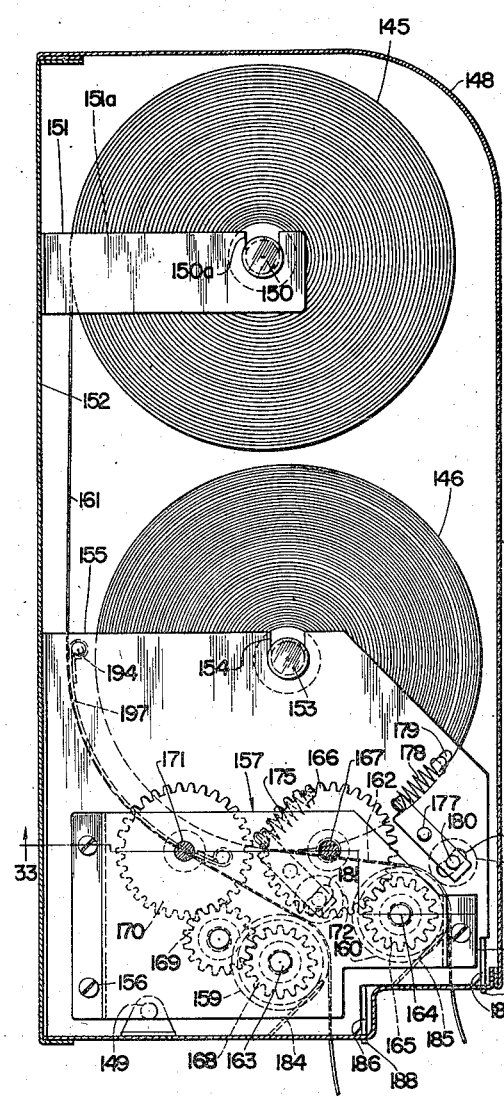
FIG. 30.
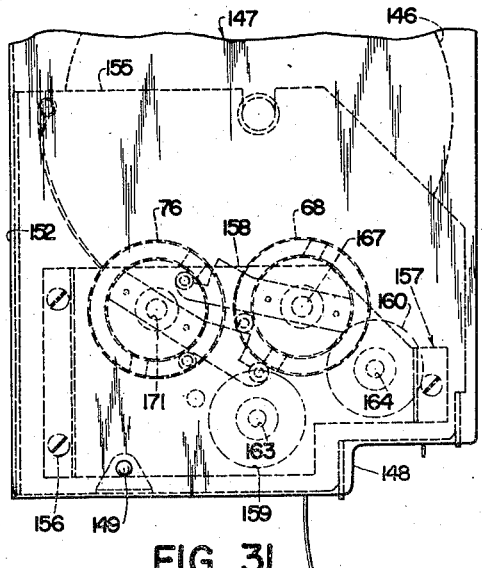
FIG. 31
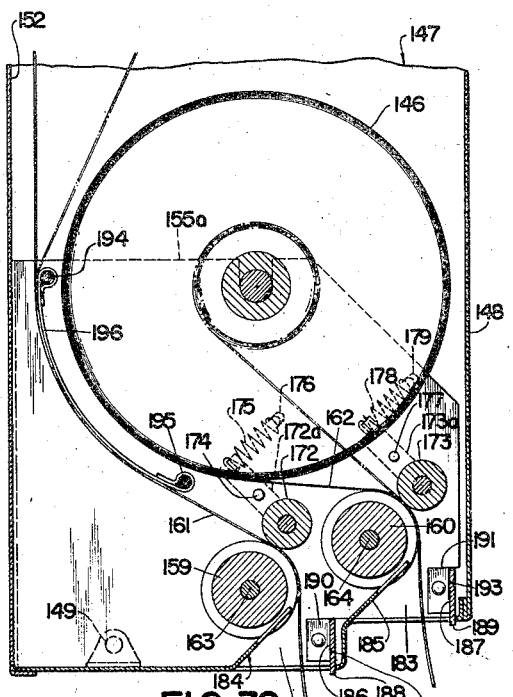
FIG. 32.
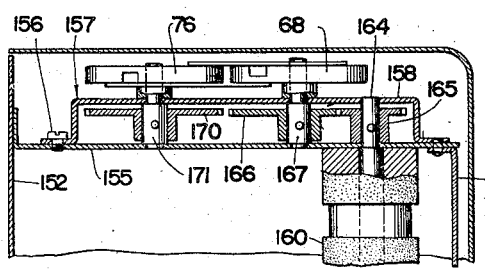
FIG. 33.
INVENTOR
FRANCIS H. SCHWARTZ.
BY 
ATTORNEY United States Patent Office 2,826,373
Patented Mar. 11, 1958

2,826,373

INTERMITTENT MOTION MECHANISM

Francis H. Schwartz, Brooklyn, N. Y.

Application July 5, 1955, Serial No. 519,798

22 Claims. (Cl. 242—55.3)

This invention relates to intermittent mechanisms, and particularly, although not exclusively, to devices for the intermittent dispensing of paper from rolls.

It is within my contemplation to provide a mechanism adapted to transmit interrupted motion in opposite directions—and especially for enabling the dispensing of a predetermined length of paper by a single manipulative effort. In this aspect of my invention, it is my objective to require separate successive manipulative efforts for obtaining additional sheets of said predetermined length. And in the accomplishment of this objective I employ, as an element of my invention, a novel mechanism providing both a positive lock to prevent the dispensing of more than said predetermined length of sheet, and means to release said locking mechanism for a subsequent dispensing cycle.

It is a further object of my invention to eliminate the relatively intricate, expensive and frequently unreliable delay and timing mechanisms generally employed in conventional devices of this category.

Another object of my invention is to reduce the number of reloading or roll-refilling operations below that required in analogous conventional devices. And in this aspect of my invention it is my object to load the device with two rolls of paper or other sheet material, and to provide means for the dispensing of sheet lengths alternately from said two rolls, whereby both are simultaneously operatively consumed, thereby enabling the simultaneous refilling of the device with two rolls.

It is further within my contemplation to provide a relatively simple, readily fabricated device capable of effectively performing the functions as above described, and which is compact and economical of space.

Other objects, features and advantages will appear from the drawings and description hereinafter given.

Referring to the drawings.

Figures 10 to 15, inclusive, are side elevational views of the locking discs employed in my invention, showing progressive positions thereof during a cycle of operation.

Figure 10A is a semi-diagrammatic representation of the outlet portion of said device, showing the relative positions of two terminal portions of paper from the two rolls within the machine when the locking discs are in the position of Figure 10.

Figure 13A is a view like Figure 10A, but showing the position of said terminal portions when the locking discs are in the position of Figure 13.

Figure 15A is a view like Figure 10A, but showing the position of said terminal portions when the locking discs are in the position of Figure 15.

Figure 15B is a view substantially like 15A, but showing the paper in reverse position of 13A, after the completion of one cycle.

Figure 16 is an end view of the locking discs of Figure 15.

Figure 17 is a section of Figure 11 taken along line 17—17.

Figure 18 is a section of Figure 12 taken along line 18—18.

Figure 19 is a section of Figure 13 taken along line 19—19.

Figure 20 is a section of Figure 14 taken along line 20—20.

Figure 21:
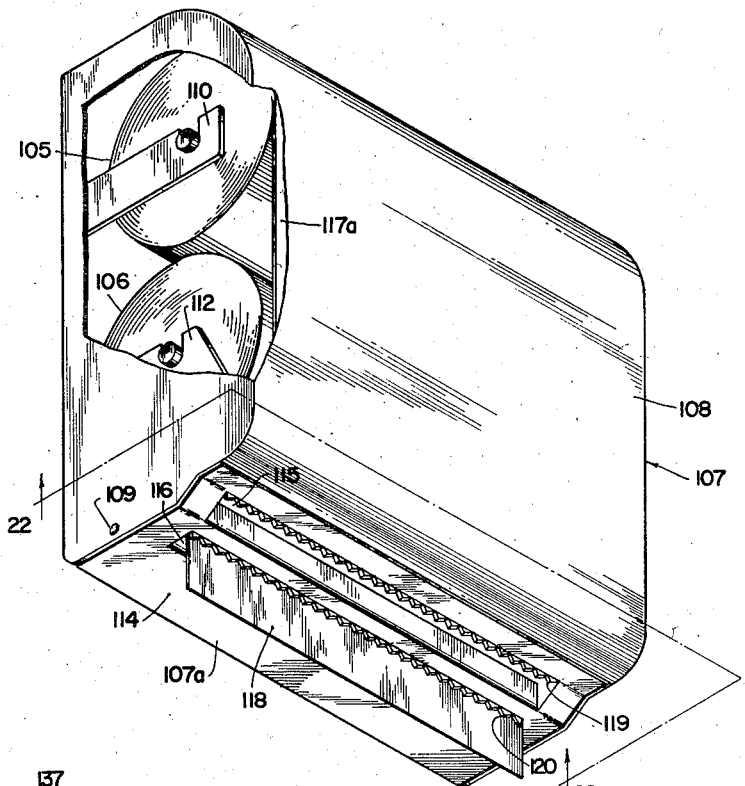

Figure 21 is a perspective view of another embodiment of my invention, showing one roll positioned above the other, a fragment being removed for clarity.

Figure 22:
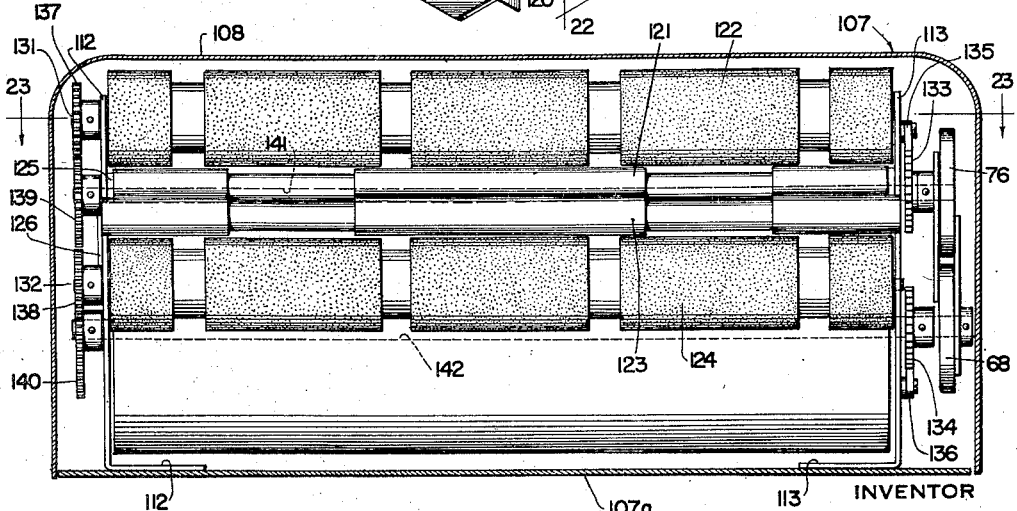

Figure 22 is a section of Figure 21 taken along line 22—22.

Figure 23:
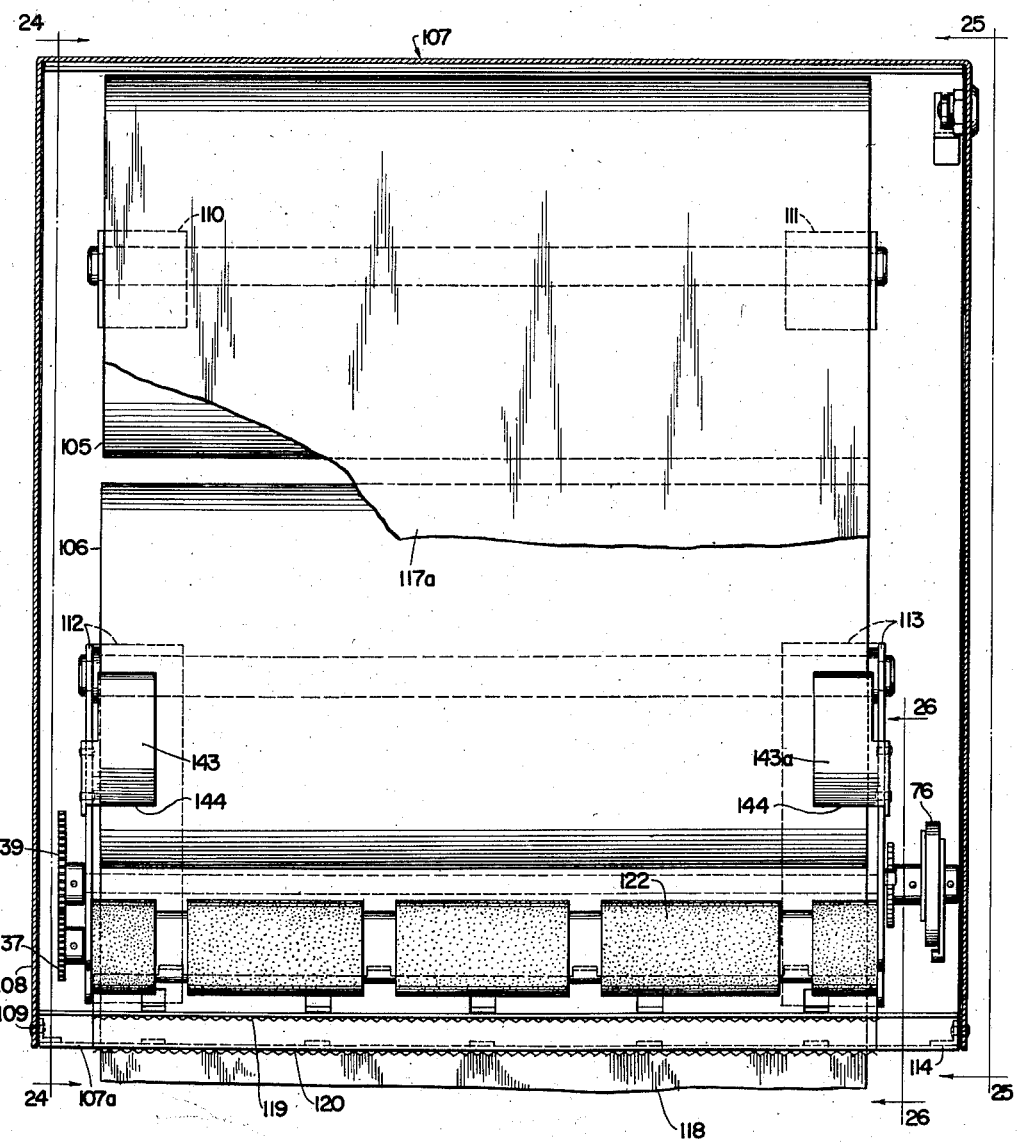

Figure 23 is a front view of the device of Figure 21, with the front cover member removed.

Figure 24 is a section of Figure 23 taken along line 24—24.

Figure 25 is a side view of Figure 23 looking in the direction of arrows 25—25.

Figure 26 is a fragmentary section of Figure 23 taken along line 26—26.

Figure 27 is a fragmentary section of Figure 24 taken along line 27—27.

Figures 28, 29:
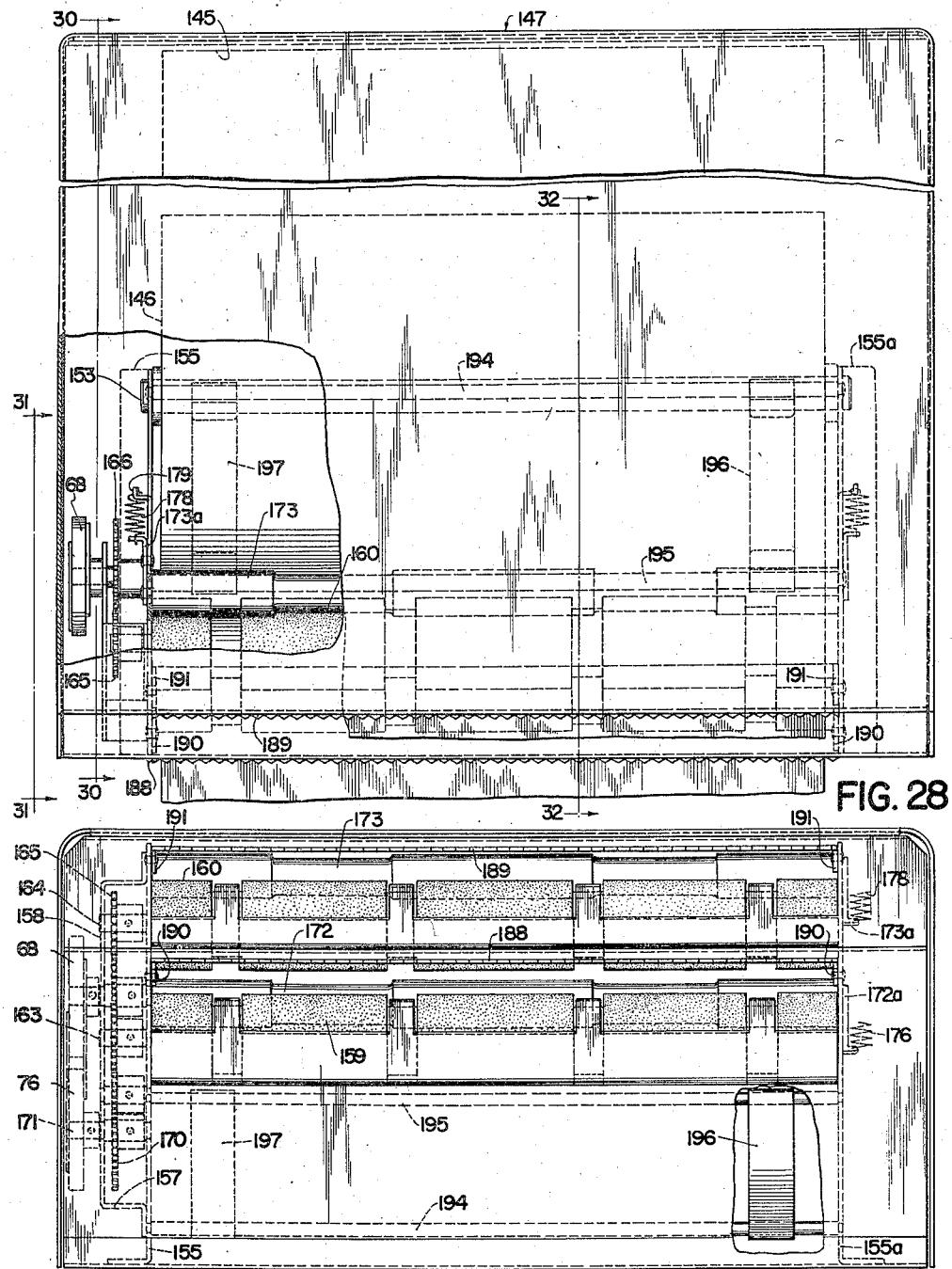

Figure 28 is a front view of a third embodiment of my invention, a fragment being removed for clarity.

Figure 29 is a bottom view of Figure 28.

Figure 30 is a section of Figure 28 taken along line 30—30.

Figure 31 is a fragmentary side view of Figure 28 looking in the direction of arrows 31—31.

Figure 32 is a fragmentary section of Figure 28 taken along line 32—32.

Figure 33 is a fragmentary section of Figure 30 taken along line 33—33.

In the form of my invention illustrated in Figures 1 to 20, I employ a casing 10, adapted for attachment to a wall or other fixed support, said casing comprising a stationary portion 11 constituting a support and housing for the rolls of paper 12 and 13 and the operatively connected mechanism, and a movable cover or closure member 14. Said stationary portion 11 of the casing comprises a rear wall 11a, four forwardly extending parallel partition walls or wings 15, 15a, 16 and 16a, upper flange 17 and base 18. Mounted upon the latter are the two brackets 19 and 20 each pivotally supporting, at pivotal points 21, said closure member 14.

The two longitudinally-aligned paper outlet apertures 25 and 26 are disposed within base 18, from which the two oblique guides 24 and 24a extend upwardly, for a purpose to be hereinafter set forth.

Figure 7:
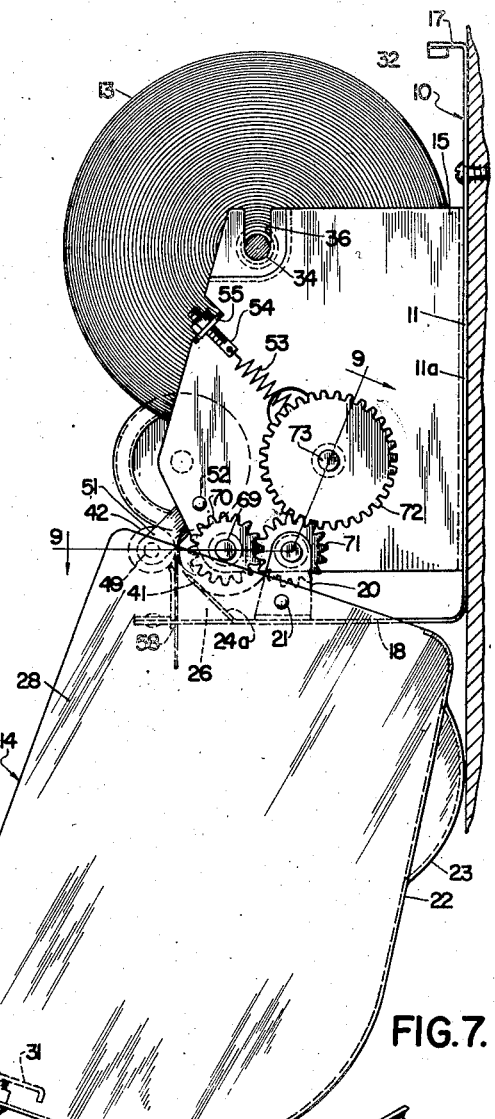
Figure 7 is a side view of Figure 3 looking in the direction of arrows 7—7, the cover being shown in its lowered position.
Figure 6:
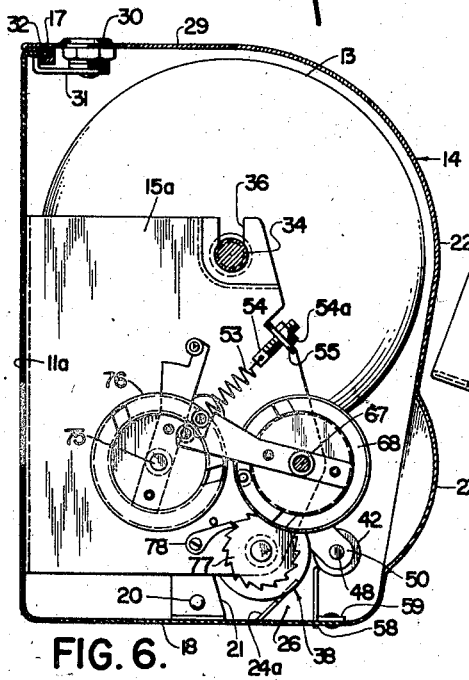
Figure 6 is a section of Figure 3 taken along line 6—6.
Figure 8:
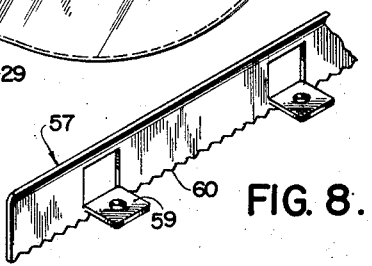
Figure 8 is a fragmentary perspective view of the paper-cutting member of said device.

Said closure member 14 contains the front wall 22 with the forwardly protruding central portion 23 for accommodating therein certain internal mechanism and also serving as a hand grip for retracting said closure to its open position shown in Figure 7 and it also contains the side walls 27 and 28, and the top wall 29, the rear portion of which carries the lock 30, the latch 31 of which is in removable engagement with the ear 32 on said flange 17 of the stationary casing component 14.

The said rolls of sheet material 12 and 13 are mounted on their respective mandrels 33 and 34, each having at their opposite terminals annular recessed portions 35 which are rotatably mounted on the recessed walls 36 at the upper portions of said walls 15, 15a, 16 and 16a. Disposed below rolls 12 and 13 are the respective measuring rollers 37 and 38, the former being rotatably mounted at 37a on partitions 16 and 16a, and the latter at 38a on walls 15 and 15a. Said measuring rollers have friction surfaces 39, which may be sandpaper, rubber or other suitable friction material; and in the preferred embodiment, each of said rollers has intermediate annular reduced portions 40 into which extend the obliquely disposed prongs 41 of the said guides 24 and 24a, said prongs being disposed for engagement with the rear surfaces of the respective sheets of the rolls 12 and 13, to prevent said sheets from being carried rearwardly and into the casing, rather than downwardly through said respective apertures 25 and 26. By referring to Fig. 5, it will be seen that while the full-line position of sheet 12a from roll 12 extends downwardly through aperture 25, the dot-dash position shows the sheet 12a in engagement with guide 24 and said prongs 41 thereof.

Adjacent said measuring rollers 38 and 37 are the respective pressure rollers 42 and 43. The opposite terminals 44 and 45 of roller 43 are rotatably mounted on the adjacent terminals of the respective levers 46 and 47; and the opposite terminals 48 and 49 of rollers 42 are rotatably mounted on the adjacent terminals of the respective levers 50 and 51. Said levers are each pivotally mounted at 52 on the adjacent one of said respective walls 15, 15a, 16 and 16a; and the terminal of each lever opposite that connected to said respective rollers 42 and 43 is connected by spring 53 to adjusting screw 54 in threaded engagement with the partition lug 55 and the nut 54a. The arrangement is such that each of said springs 53 exerts a pull on the attached lever so as yieldably to urge the pressure rollers 42 and 43 towards the respective measuring rollers 38 and 39. Hence, with a sheet from one of the rolls, such as sheets 12a from roll 12 (Fig. 5), disposed between coacting measuring and pressure rollers, such as rollers 39 and 43, the sheet will be frictionally engaged by both rollers, so that when a downward pull is applied to sheet 12a, it will cause opposite operative rotations of said coacting rollers when they are free to rotate. It is also evident that for each rotation of the measuring roller there is a linear downward movement of the engaged sheet equal to the circumference of the measuring roller.

Figure 1:
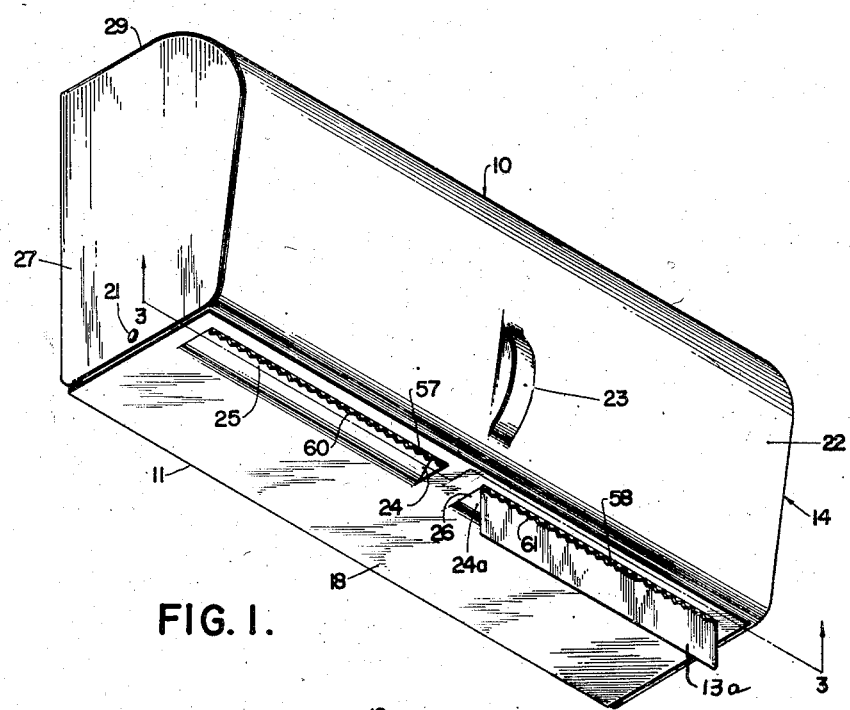
Figure 1 is a perspective view of one form of dispensing device according to my invention in which two rolls of paper are positioned side by side.
Figure 2:
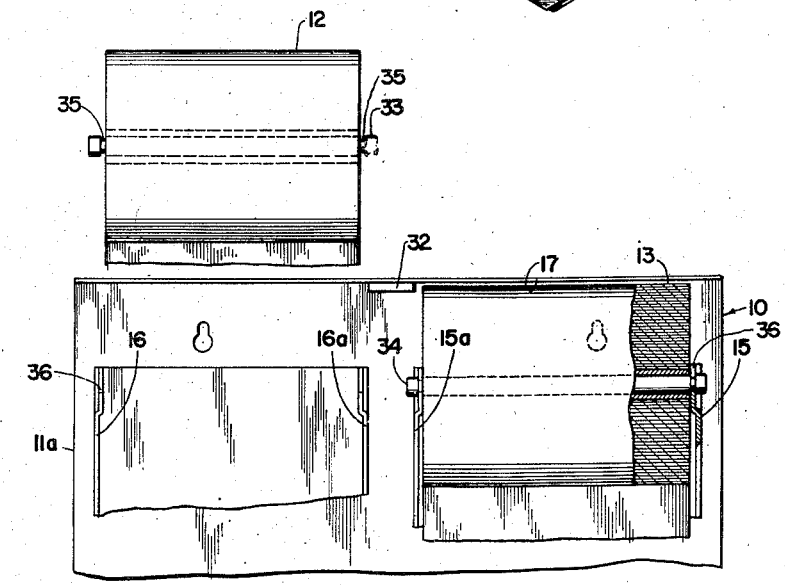
Figure 2 is a fragmentary front view of the device of Figure 1 with the front cover removed, one paper roll being shown partly in section and disposed within the casing, and the other being shown positioned above the casing prior to inserting it into place.
Figure 3:
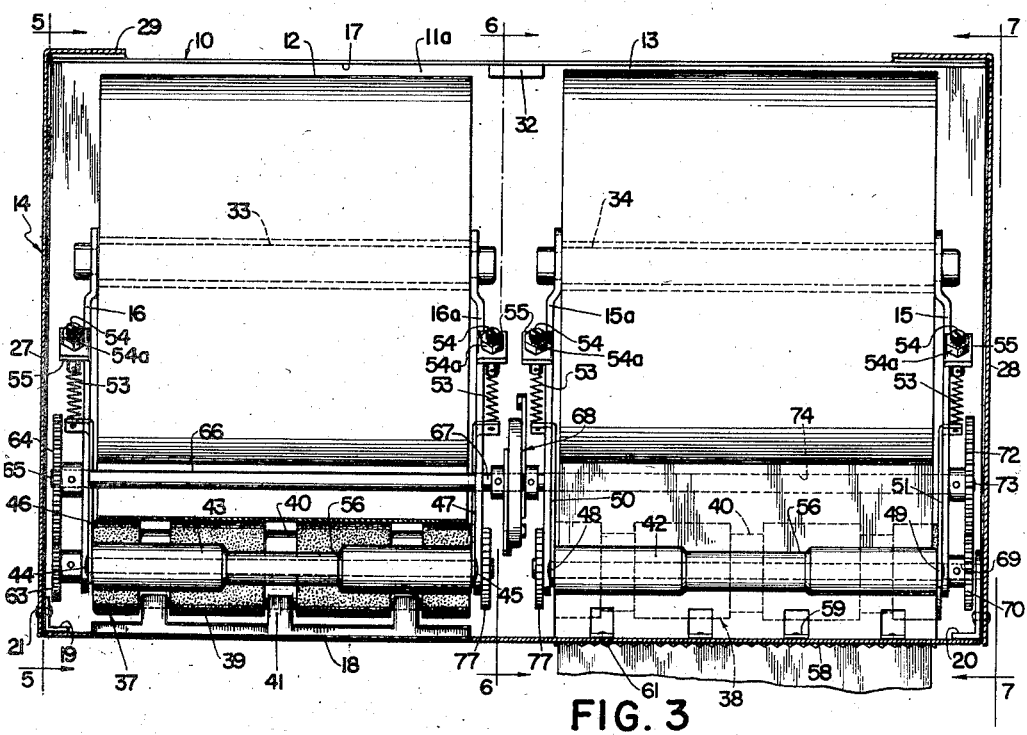
Figure 3 is a section of Figure 1 taken substantially along line 3—3 of Figure 1.
Figure 4:
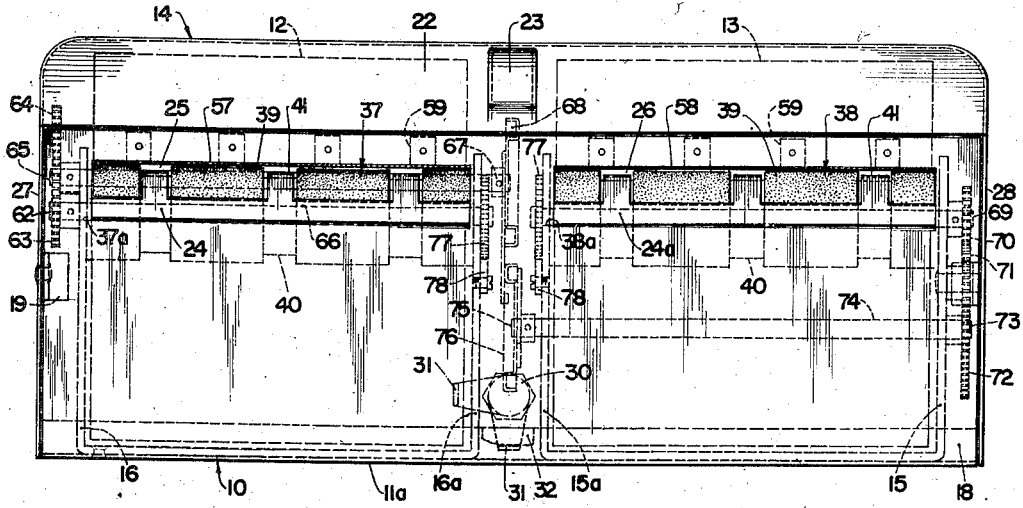
Figure 4 is a bottom view of Figure 1.
Figure 9:
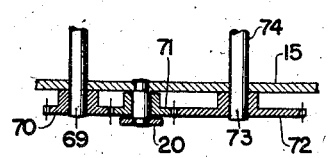
Figure 9 is a fragmentary section of Figure 7 taken substantially along line 9—9.
Figure 5:
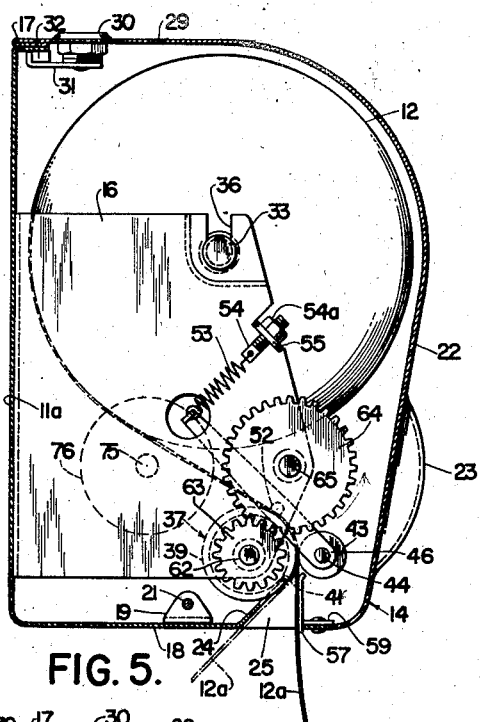
Figure 5 is a section of Figure 3 taken along line 5—5.

In the positioning of the two rolls 12 and 13 for operative use, the pressure rollers are grasped by the reduced medial portions 56 and moved outwardly away from the coacting measuring rollers, against the action of spring 53; and with the measuring and coacting rollers thus separated, the lower terminal portion of the sheet can be threaded into dispensing position, such as is shown in Fig. 5.

The base 18 of the portion 14 of casing 10 has attached thereto, along the edges of said apertures 25 and 26 opposite said guide walls 24 and 24a, respectively, the knife members 57 and 58, the punched-out flaps 59 being fastened to said base 18. The respective cutting edges 60 and 61 extend downwardly slightly below base 18, to enable a sheet, such as sheet 12a (Fig. 5) to be torn against the adjacent cutting edge.

Fixedly mounted on the terminal 62 of measuring roller 39 is the gear 63 which is in engagement with gear 64 attached to the outer terminal 65 of shaft 66, this shaft extending through and being rotatably mounted on said partitions 16 and 16a. The inner terminal portion 67 of shaft 66 is attached to the locking disc 68 (to be hereinafter described), so that a rotation of shaft 66 and the parts associated therewith, including roller 39, will cause an operative rotation of said locking disc 68 when it is free to rotate, as will hereinafter appear.

Fixedly mounted on terminal 69 of measuring roller 38 is the gear 70, this being in engagement with the idler gear 71 rotatably supported on bracket 20. Said idler gear is in engagement with gear 72 attached to the outer terminal 73 of shaft 74, shown parallel to shaft 66 and at the level thereof. The inner terminal 75 of shaft 74 is attached to the locking disc 76, so that a rotation of shaft 74 and the parts associated therewith, including roller 38, will cause an operative rotation of said locking disc 76, when it is free to rotate.

The two said locking discs 68 and 76 and their respective components together constitute a novel form of motion-transmitting mechanism—for transmitting, alternately and intermittently, motion of connected members in opposite directions. This mechanism has particular utility in the field of paper dispensing, as will appear from the following description.

When the two rolls 12 and 13 are operatively mounted within the casing 10, and the sheets from said rolls are threaded between the said respective measuring and pressure rollers, the free ends of the sheets from said rolls will extend out through said apertures 25 and 26. The said locking discs 68 and 76 are so constructed, as will hereinafter appear, that when a pull is applied to one of said free ends, such as 12a, coming from its roll, the sheet will move outwardly until a predetermined length thereof will extend from the aperture, whereupon the locking disc associated with the roll being dispensed will become locked, preventing further movement. The extending sheet can then be torn off along the coacting edge 60 or 61 of the corresponding cutting device. At this point the free end of the other roll extends out partially—a sufficient amount for convenient grasping. If then, a pull is applied to this partially extending free end, the sheet will move outwardly until a portion thereof of the said predetermined length will extend from its coacting aperture 25 or 26, whereupon the other locking disc will at this point become locked, preventing further outward movement of the sheet. The fully extending sheet can then be torn off along the cutting edge of the adjacent cutting device. At this point, the free end of the first roll now extends outwardly a sufficient amount for convenient grasping. This cycle of operations can be repeated by applying pulls to alternate ones of said partially extending free ends—each pull enabling the predetermined length of sheet to be drawn from the device.

For most effective operation, the measuring rollers 38 and 37 have at terminal ends thereof a ratchet 77 and a pawl 78, to permit a rotation of said rollers only in one direction—that producing an outward feed of the paper. It is also essential that gears 64 and 72 be of equal diameters and the same number of teeth, each of these to bear a predetermined relation to the respective driving gears 63 and 70. In the illustrated structure, said driving gears 63 and 70 are each one-half the diameter of each of said driven gears 64 and 72, so that each of the latter will rotate once for every two revolutions of the respective driving gears 63 and 70. If the predetermined length of a dispensed sheet is A inches and the circumference of each of the driving gears 63 and 70 is ½A inches, two full revolutions of a driving gear is required for each dispensing movement. And since, in the illustrated case, the ratio of the said driven gears to the respective driving gears is two to one, each dispensing movement will entail a single revolution of a driven gear—and consequently of the corresponding locking disc. It will be further observed that driven gears 64 and 72 rotate in opposite directions, due to the interposition of said idler gear 71 between gears 70 and 72. It is thus evident that said locking discs 68 and 76 are operatively rotatable in opposite directions.

The said locking discs 68 and 76 are similar in construction—having similar elements and being of similar proportions. In the forms illustrated, each is made of pressed-out metal mounted upon a terminal of either shaft 66 or 74, and having affixed thereto a radial arm. The two discs are rotatably mounted on parallel axes, are in adjacent relation and substantially in one plane—but facing in opposite directions.

Specifically, disc 76 has on the front face 79 thereof the raised peripheral rim 80, the inner annular limiting wall 81 of which defines the central cavity 82. At opposite portions of said rim are the apertured portions 83 and 84—the former constituting an entrance gate, and the latter an exit gate, as will more clearly hereinafter appear. Disposed on rim 80 is the peripheral pin 85, preferably in the form of a roller 85, the illustrated structure showing it closer to gate 83 than to gate 84. The rear face 79a has fixedly attached thereto the radial arm 86 with an extension 87 proportioned to extend over the central cavity 89 of the coacting disc 68. At the outer portion of arm 86 is the terminal pin or roller 88, preferably in the form of a roller proportioned and positioned to extend into said cavity 89 and engage the annular limiting wall 90 thereof. The extension 87 of arm 86 also has the radially extending cam wall 91 disposed intermediate the opposite ends of the arm 86 and in intersecting relation to the radial line 92 extending through the center of roller 88. Extension 87 also has thereon the stop wall 93 disposed inwardly and in spaced relation to roller 88 to provide recess 94—said stop wall 93 being preferably arcuate and concentric with the perimeter of disc 76.

Disc 68 has parts corresponding to those of disc 76 hereinabove described, to wit, the aforesaid central cavity 89 and annular wall 90, the raised rim 95, the entrance gate 96, the exit gate 97, the peripheral pin or roller 98, and the radial arm 99 with its extension 100, the intermediate cam wall 101, stop wall 102, terminal pin or roller 103, and recess 104.

To facilitate an understanding of the operation of said locking discs, representations of the extending free sheet ends of the respective two associated rolls are positioned alongside of Figures 10, 13 and 15, so as to show the respective extended lengths of said sheets at different operative positions of the discs. Fig. 10A diagrammatically shows a sheet end X of sheet 12a extended a length B, during the process of pulling the sheet in the direction of arrow D—the full predetermined length being B+C as shown in Fig. 13A. When sheet X extends outwardly the said length B, sheet Y representing sheet 13a is just beginning to emerge; and the locking discs are in the positions shown in Fig. 13.

The said pull in the direction of arrow D causes disc 68 to rotate in the direction of arrow E, at which point cam wall 101 engages roller 85 of disc 76, causing the latter to rotate in the counterclockwise direction of arrow F. This rotation causes sheet Y to move outwardly, since disc 76 is operatively connected with the roll of sheet Y, as aforesaid. As both discs are thus caused to rotate, the roller 103 will enter the entrance gate 83 of disc 76, said gate being so proportioned and positioned as to provide an entrance path to said roller 103. The discs will continue to move in this manner until roller 103 engages annular limiting wall 81 of disc 76, whereupon no further movement of disc 68 is possible. When this occurs, sheet X is extended a length B+C, as indicated in Fig. 13A, and sheet Y is extended a length C—sufficient to enable it to be manually grasped. All further attempts to pull sheet X outwardly will fail, since disc 68 and its associated parts are held locked against movement.

It will be noted (Fig. 13) that disc 76 is held against clockwise movement by stop wall 102, since roller 85 is within recess 104 and in abutment with said stop wall 102. However, disc 76 is free to move in counterclockwise direction F. Since the mechanism associated with sheet Y is, as aforesaid, operatively connected to disc 76, a downward pull of sheet Y will cause disc 76 to rotate in the direction of arrow F. As this continues, roller 88 enters gate 96, in the manner aforesaid (see Fig. 15) the cam wall 91 having engaged roller 98 to cause a rotation of disc 68. During the operative clockwise rotation of said disc 68, its said arm 99 necessarily moves with it. The length of said arm and the position and proportions of exit gate 84 are such that upon a continued rotation of disc 68 in the direction of arrow E, the roller 103, which had been rolling along said annular wall 81 of disc 76, will move outwardly through said gate 84, as indicated in Fig. 15. In the meantime, the continued rotation of disc 76 in direction F will bring roller 88 into engagement with the annular wall 90 of disc 68, whereupon no further movement of disc 76 is possible—and consequently, no further outward movement of sheet Y is possible. At this limiting position of sheet Y, sheet X is partially extended, as indicated in Fig. 15B, to permit a manual grasping thereof.

It will be observed that when disc 68 is again operatively rotated in the direction of arrow E, with the consequent opposite rotation of disc 76, the roller 88 of the latter will move outwardly through exit gate 97 of disc 68. Thus, by alternate pulls on sheets X and Y, the above described cycle is repeatedly effected.

In the form of my invention shown in Figs. 21 to 27, rolls 105 and 106 are positioned one above the other in casing 107, the stationary portion 107A of which contains the dispensing mechanism, and the closure member 108 of which is pivotally mounted at 109 (Fig. 21) of the stationary portion 107A. The latter contains therein the lateral brackets 110 and 111 at the upper portion of the casing, and the lateral walls 112 and 113 at the bottom of the casing, the upper roll 105 being rotatably supported by said brackets 110 and 111, and the lower roll 106 being rotatably supported by the said walls 112 and 113.

The base 114 of the stationary component 107A of the casing has the two adjacent coextensive apertures 115 and 116, the former for receiving therethrough the free end 117 of the sheet of upper roll 105, and the latter for receiving therethrough the free end 118 of the sheet of lower roll 106. Cutting devices 119 and 120 are supported by base 114 at said respective apertured portions 115 and 116, to permit a tearing off of the sheets, substantially in the manner aforesaid.

Sheet 117 passes between the pressure roller 121 and measuring roller 122; and sheet 118 passes between the pressure roller 123 and measuring roller 124. Said pressure rollers are mounted on the respective levers 125 and 126 which are pivotally supported at 127—the upper terminals of said levers being connected by the tension spring 128, whereby the pressure rollers 121 and 123 are yieldably urged towards the said respective measuring rollers 122 and 124.

On the respective shafts 141 and 142 are affixed the respective ratchet wheels 133 and 134, coactively associated with the respective pawls 135 and 136 to permit rotation of said locking discs only in one direction. At the terminal portions of said shafts 131 and 132 supporting the respective measuring rollers 122 and 124 are attached the respective gears 137 and 138, these being in engagement with the gears 139 and 140, respectively. The latter two gears are mounted on the respective shafts 141 and 142, which are in parallel relation and extend transversely through the casing 107—the ends of said shafts opposite gears 139 and 140 fixedly carrying the locking discs 68 and 76, similar in construction and operation to the corresponding discs 68 and 76 employed with the form of my invention first above described.

It is apparent that alternate pulls on sheet ends 117 and 118 will cause alternate releasing and locking movements of said discs 68 and 76, precisely in the manner above described—and will thereby alternate dispensing operations of sheets of predetermined lengths to be effectuated.

It will be observed that the sheet from roll 105 extends down along the front of the casing, and is positioned to cause a counterclockwise rotation of measuring roller 122 (Fig. 24) whereas the sheet from roll 106 extends downward along the rear of the casing, and is positioned to cause a clockwise rotation of measuring roller 124. Since said measuring rollers are thus rotatable in opposite directions, their operative rotation during downward pulls upon their respective sheet ends 117 and 118 will cause said locking discs 68 and 76 also to rotate in opposite directions, as in the case of the corresponding discs of the first embodiment described.

As the upper roll 105 decreases in diameter during use, the direction of sheet 117a will become more and more inclined, as indicated by the dot-dash lines of Fig. 25. To assure the proper path of sheet 117a towards coacting rollers 121 and 122, the guide plates 143 and 143a are attached to walls 112 and 113, respectively, said plates having front curved guiding walls 144 over which said sheet 117a passes. In this manner, regardless of the diameter of upper roll 104, the path of the sheet drawn therefrom is in the proper direction for most efficient operation.

In the form of my invention illustrated in Figs. 28 to 33, rolls of paper 145 and 146 are also positioned one above the other, substantially like the relative positioning of the two rolls in the previously described embodiment of my invention of Figs. 21 to 27. However, whereas in the former embodiment the terminal ends of the respective rolls are directed towards their respective outlet apertures from opposite sides of the roll, in this last mentioned form of my invention the terminal portions are both directed in the same general direction—downwardly and forwardly to their respective outlet apertures from the rear side of the rolls.

The arrangement is hence such, as will more clearly appear from the description hereinafter given, that the said outlet terminal portions of the two sheets being dispensed will curl in the same general direction, whereby the successive tearing-off of sheets will be accomplished in uniform manner, and with uniform results.

Both of said rolls 145 and 146 are mounted within the casing 147, the closure member 148 thereof being hingedly connected at 149, to enable said closure member to be swung downwardly, thereby to expose the interior of casing 147, in obvious manner. The mandrel 150 of roll 145 is rotatably mounted, at the opposite end portions thereof, within the notched portions or bearings 150a of the two laterally opposite supporting brackets 151 and 151a attached to the rear wall 152 of casing 147. The mandrel 153 of the roll 146 has its opposite end portions similarly rotatably disposed within notched portions or bearings 154 of the two opposite lateral walls 155 and 155a. Secured by fasteners 156 to lateral wall 155 is the gear housing 157, the outer wall 158 thereof being in spaced relation to wall 155. Disposed within the said housing are a plurality of gears, to be hereinafter described, rotatably supported between said walls 155 and 158, said gears being operatively connected to the locking discs 68 and 76 similar to corresponding discs hereinabove described.

Disposed below the roll 146 are the two measuring rollers 159 and 160, the former being positioned to receive the sheet 161 from upper roll 145, and the latter to receive the sheet 162 from the lower roll 146. Said measuring rollers 159 and 160 carry the respective shaft extensions 163 and 164, said extensions extending transversely through said housing 157 and being rotatably mounted upon the said outer wall 158 thereof. Shaft extension 164 has fixedly mounted thereon the gear 165 which is in engagement with the gear 166, the latter being mounted on the shaft 167 carrying the said locking disc 68. Shaft extension 163 has fixedly mounted thereupon the gear 168 which is in engagement with the intermediate idler gear 169 which in turn is in engagement with the gear 170, the latter being fixedly mounted upon shaft 171 rotatably carrying the said locking disc 76.

The arrangement is hence such that a clockwise rotation of gear 165 (Figure 30) will cause a counter-clockwise turning of gear 166, whereas a clockwise turning of gear 168 will cause a clockwise turning of gear 170. Hence, the operative clockwise rotation of said gears 165 and 170 will cause opposite operative rotational movements of the said locking dics 68 and 76, analogous to the operative movements of the corresponding locking discs hereinabove described.

Pressure rollers 172 and 173 are spring-loaded and positioned for yieldable pressure against the respective measuring rollers 159 and 160. In the specific form illustrated, pressure roller 172 has at opposite sides the arms 172a each pivotally mounted on 174 and having the respective terminals thereof connected to a spring 175 anchored at 176. Similarly, the pressure roller 173 has at opposite sides thereof the arms 173a each pivotally mounted at 177, the terminals of said arms being connected, respectively, to springs 178 anchored at 179. The lower terminals of each of said arms 172a and 173a contains a pin 180 extending into respective arcuate slots 181 in the respective walls 155 and 155a. The arrangement is hence such that through the action of said respective springs 175 and 178, said pressure rollers 172 and 173 exert yieldable pressure upon the respective sheets 161 and 162 passing between respective pairs of said co-acting measuring rollers and pressure rollers.

At the lower portion of casing 147, and below the respective measuring rollers 159 and 160, are the paper outlet apertures 182 and 183, there being oblique guides 184 and 185 extending upwardly to points below said measuring rollers 159 and 160, substantially like the corresponding guides in the form of my invention first above described. Cutting members 186 and 187 are attached to the sides of the casing so that their respective cutting edges 188 and 189 extend below said outlet apertures. The particular form of cutting member illustrated is angle-shaped, containing respective legs 190 and 191 substantially at right angles to the respective walls 192 and 193, the bottoms of which contain the cutting edges 188 and 189.

Extending transversely through casing 147, and supported by the opposite lateral walls 155 and 155a thereof, are the two tie rods 194 and 195. Slidably mounted over said rods, and positioned behind and in spaced relation to the lower paper roll 146, are the two guide members 196 and 197. These members are each of curved configuration, and adapted to receive against the rear surface thereof the sheet 161 extending downwardly from the upper roll 145. In this way said sheet is always maintained in spaced relation to the lower roll 146, even when the upper roll 145 has been reduced in diameter, as indicated by the dot-dash representation of the path of said sheet in Figure 32.

The said sheets 161 and 162 pass over their respective measuring rollers 159 and 160, and extend downwardly through the said apertures 182 and 183. As the outwardly extending portions of these sheets are alternately pulled downwardly, in the manner above described with respect to the first embodiment of my invention, said terminal portions are each in a position to be operatively brought against the respective cutting edges 188 and 189, whereby they can be severed in obvious manner.

As above stated, the cycle of operations of the two locking discs 68 and 76 is like that of the other embodiments of my invention described hereinabove, alternate pulls on the respective sheet ends causing alternate releasing and locking movements of said discs 68 and 76.

It will be observed that in this last mentioned form of my invention the only shafts (other than those supporting the rolls) extending transversely across the casing 147 are those associated with the measuring rollers 159 and 160—the only other members extending across the said casing being said tie rods 194 and 195. Hence, this last embodiment of my invention is simpler than the first two forms thereof, since it permits a simple and accessible housing member 157 to support the gears operatively associated with the adjacent locking discs 68 and 76.

In each of the various embodiments of my invention, effective mechanism is provided to assure the dispensing of sheets of predetermined length. The positive locking feature prevents the withdrawal of more than said length—and moreover, introduces that interruption to the dispensing operation that, in conventional devices, is sought to be accomplished by relatively expensive and at times unreliable timing and delay mechanisms. Furthermore, because of the coactive use of two rolls in a single compact device, the reloading operations are halved over that of conventional single-roll devices.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In an intermittent motion mechanism, two adjacent rotatable coacting members mounted on substantially parallel axes; each of said members having a wall in a plane substantially normal to the axis of rotation of the member, a limiting wall thereon curved in concentric relation to the axis, and a pin on said first-mentioned wall; an arm affixed to each of said members, each of said arms being proportioned to extend across a portion of the coacting member and having an intermediate portion engageable with the said pin on the adjacent coacting member, the said intermediate portions and said pins being so proportioned and positioned that the member carrying the engaged pin will be rotatably actuated during such engagement upon the operative rotation of the other member; each of said arms also having an outer portion engageable with the limiting wall on the adjacent coacting member, said outer portions and said limiting walls being so proportioned and positioned that the arm with said engaging outer portion will be held against movement by the engaged limiting wall, whereby the member carrying said last-mentioned arm will be similarly held against movement; and intermittent actuating means for operatively rotating said members in opposite directions.

2. In an intermittent motion mechanism, the combination according to claim 1, the said members lying in substantially the same plane, the said pin, limiting wall and arm of one member facing opposite the pin, limiting wall and arm of the other member.

3. In an intermittent motion mechanism, the combination according to claim 1, said arms being disposed substantially radially on their respective members.

4. In an intermittent motion mechanism, the combination according to claim 1, said arms being disposed substantially radially on their respective members, said outer portion of each arm having thereon a peripheral pin disposed on a radial line extending through the axis of rotation of the member supporting the arm; the said intermediate portion of each of said arms having a radially disposed cam wall in intersecting relation to said first-mentioned radial line.

5. In an intermittent motion mechanism, the combination according to claim 1, said arms being disposed substantially radially on their respective members, said outer portion of each arm having thereon a peripheral pin disposed on a radial line extending through the axis of rotation of the member supporting the arm; the said intermediate portion of each of said arms having a radially disposed cam wall in intersecting relation to said first-mentioned radial line, and a generally transverse stop wall disposed inwardly and in spaced relation to said peripheral pin, whereby a recessed portion is provided in each arm adjacent the outer terminal thereof, said stop walls being so proportioned and positioned that each wall is in engagement with the pin of the adjacent coacting member when the limiting wall of the latter is in operative engagement with the outer portion of the arm on the other member.

6. In an intermittent motion mechanism, two adjacent coacting discs rotatably mounted on substantially parallel axes; each of said discs having on one face thereof a raised peripheral rim with an annular limiting wall defining a central cavity, substantially opposite portions of each of said rims being apertured, one of said apertured portions on each rim constituting an entrance gate, the other of said apertured portions on each rim constituting an exit gate; a pin on each of said rims extending substantially parallel to said axes; a substantially radial arm affixed to each of said discs and having an extension proportioned to extend over the central cavity on the said adjacent coacting disc; each of said arms carrying on the outer terminal thereof a transverse terminal pin proportioned and positioned to extend into the central cavity on said adjacent coacting disc and to engage the said annular limiting wall thereof, whereby the arm and disc carrying said engaging transverse pin will be held against movement by the engaged limiting wall; each of said arms having thereon a cam portion positioned and proportioned to engage the pin on the rim of the adjacent coacting disc during an operative rotation of the disc carrying the engaging cam portion, whereby the disc carrying the engaged pin will be caused to operatively rotate; the said entrance and exit gates being respectively proportioned to accommodate the terminal pin carried by the arm of the adjacent coacting disc, and being positioned, respectively, along the path of said last-mentioned terminal pin as the arm of said adjacent coacting disc operatively traverses the other disc, whereby said terminal of one arm will operatively move through said respective entrance and exit gates of the adjacent coacting disc during the operative rotation of the discs, and intermittent actuating means for operatively rotating said discs in opposite directions.

7. In an intermittent motion mechanism, the combination according to claim 6, said respective peripheral rims, central cavities and arms being disposed on opposing faces of said respective discs.

8. In an intermittent motion mechanism, the combination according to claim 6, said respective peripheral rims, central cavities and arms being disposed on opposing faces of said respective discs, said terminal pins at the outer terminals of said arms being rotatably mounted, whereby they constitute rollers adapted to rollably engage said respective annular limiting walls.

9. In an intermittent motion mechanism, the combination according to claim 6, each of said arm extensions having a generally transverse substantially convex stop wall disposed inwardly and in spaced relation to the peripheral pin on the terminal thereof, whereby a recessed portion is provided in each arm adjacent the outer terminal thereof, said stop walls being so proportioned and positioned that each wall is in engagement with the pin of the adjacent coacting disc when the limiting wall of the latter is in operative engagement with the terminal pin of the arm on the other disc.

10. In a sheet dispensing device, two adjacent rolls of paper, a rotatable mounting for each of said rolls, a housing for said rolls and mountings, apertured outlet means positioned to receive therethrough the free end portions of sheets from said respective rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for the rolls and said locking member shafts, whereby operative rotational movements of said mountings will cause operative rotational movements of said respective shafts, said shafts being operatively connected to said transmission means for rotation in opposite directions, means to hold one of said locking members against rotation while the other member is free to rotate, and means to hold said latter member against rotation while said former member is free to rotate.

11. In a sheet dispensing device, two adjacent rolls of paper, a rotatable mounting for each of said rolls, a housing for said rolls and mountings, apertured outlet means positioned to receive therethrough the free end portions of sheets from said respective rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for the rolls and said locking member shafts, whereby operative rotational movements of said mountings will cause operative rotational movements of said respective shafts, said shafts being operatively connected to said transmission means for rotation in opposite directions; an arm affixed to each of said members and movable during the operative rotation of the respective members between respective projected locking positions and respective retracted positions, the arm of each member being engageable with the other member at the arm's said locking position to hold the engaged member against rotation, the arm of each member being out of engagement with the other member at the arm's respective retracted positions.

12. In a sheet dispensing device, two adjacent rolls of paper, a rotatable mounting for each of said rolls, a housing for said rolls and mountings, apertured outlet means positioned to receive therethrough the free end portions of sheets from said respective rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for the rolls and said locking member shafts, whereby operative rotational movements of said mountings will cause operative rotational movements of said respective shafts, said shafts being operatively connected to said transmission means for rotation in opposite directions; said locking members each having a wall in a plane substantially normal to the axis of rotation of the member, a limiting wall thereon curved in concentric relation to the axis, and a pin on said first-mentioned wall; an arm affixed to each of said members, each of said arms being proportioned to extend across a portion of the coacting member and having an intermediate portion engageable with the said pin on the adjacent coacting member, the said intermediate portions and said pins being so proportioned and positioned that the member carrying the engaged pin will be rotatably actuated during such engagement upon the operative rotation of the other member; each of said arms also having an outer portion engageable with the limiting wall on the adjacent coacting member, said outer portions and said limiting walls being so proportioned and positioned that the arm with said engaging outer portion will be held against movement by the engaged limiting wall, whereby the member carrying said last-mentioned arm will be similarly held against movement.

13. In a sheet dispensing device, the combination according to claim 12, the said locking members lying in substantially the same plane, the said pin, limiting wall and arm of one member facing opposite the pin, limiting wall and arm of the other member.

14. In a sheet dispensing device, the combination according to claim 12, said arms being disposed substantially radially on their respective members, said outer portion of each arm having thereon a peripheral pin disposed on a radial line extending through the axis of rotation of the member supporting the arm; the said intermediate portion of each of said arms having a radially disposed cam wall in intersecting relation to said first-mentioned radial line.

15. In a sheet dispensing device, the combination according to claim 12, said arms being disposed substantially radially on their respective members, said outer portion of each arm having thereon a peripheral pin disposed on a radial line extending through the axis of rotation of the member supporting the arm; the said intermediate portion of each of said arms having a radially disposed cam wall in intersecting relation to said first-mentioned radial line, and a generally transverse stop wall disposed inwardly and in spaced relation to said peripheral pin, whereby a recessed portion is provided in each arm adjacent the outer terminal thereof, said stop walls being so proportioned and positioned that each wall is in engagement with the pin of the adjacent coacting member when the limiting wall of the latter is in operative engagement with the outer portion of the arm on the other member.

16. In a sheet dispensing device, two adjacent rolls of paper, a rotatable mounting for each of said rolls, a housing for said rolls and mountings, apertured outlet means positioned to receive therethrough the free end portions of sheets from said respective rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for the rolls and said locking member shafts, whereby operative rotational movements of said mountings will cause operative rotational movements of said respective shafts, said shafts being operatively connected to said transmission means for rotation in opposite directions, said locking members each comprising a disc rotatably mounted on substantially parallel axes; each of said discs having on one face thereof a raised peripheral rim with an annular limiting wall defining a central cavity, substantially opposite portions of each of said rims being apertured, one of said apertured portions on each rim constituting an entrance gate, the other of said apertured portions on each rim constituting an exit gate; a pin on each of said rims extending substantially parallel to said axes; a substantially radial arm affixed to each of said discs and having an extension proportioned to extend over the central cavity on the said adjacent coacting disc; each of said arms carrying on the outer terminal thereof a transverse terminal pin proportioned and positioned to extend into the central cavity on said adjacent coacting disc and to engage the said annular limiting wall thereof, whereby the arm and disc carrying said engaging transverse pin will be held against movement by the engaged limiting wall; each of said arms having thereon a cam portion positioned and proportioned to engage the pin on the rim of the adjacent coacting disc during an operative rotation of the disc carrying the engaging cam portion, whereby the disc carrying the engaged pin will be caused to operatively rotate; the said entrance and exit gates being respectively proportioned to accommodate the terminal pin carried by the arm of the adjacent coacting disc, and being positioned, respectively, along the path of said last-mentioned terminal pin as the arm of said adjacent coacting disc operatively traverses the other disc, whereby said terminal of one arm will operatively move through said respective entrance and exit gates of the adjacent coacting disc during the operative rotation of the discs.

17. In a sheet dispensing device, two adjacent rolls of paper, a rotatable mandrel for each of said rolls, a casing for said rolls and mandrels, outlet apertures in said casing positioned to receive therethrough the free end portion of sheets from said respective rolls, two measuring rollers, pressure rollers yieldably urged towards and coacting with said measuring rollers, said coacting measuring and pressure rollers being positioned to accommodate therebetween and engage sheets operatively extending from said respective rolls, two adjacent rotatable coacting locking members, two shafts supporting said respective members, transmission means connecting said respective measuring rollers and said locking member shafts, whereby operative rotational movements of said measuring rollers will cause operative rotational movements of said respective shafts, said shafts being operatively connected to said transmission means for rotation in opposite directions, means to hold one of said locking members against rotation while the other member is free to rotate, and means to hold said latter member against rotation while said former member is free to rotate.

18. In a sheet dispensing device, two adjacent rolls of paper, a rotatable mandrel for each of said rolls, a casing for said rolls and mandrels, said mandrels and the respective rolls thereon being in substantially horizontal alignment, two longitudinally aligned outlet apertures at the bottom of the casing underlying said respective rolls and positioned to receive therethrough the free end portions of sheets from said rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for rolls and said locking member shafts, whereby operative rotational movements of said mountings will cause operative rotational movements of said respective shafts, said shafts being operatively connected to said transmission means for rotation in opposite directions, means to hold one of said locking members against rotation while the other member is free to rotate, and means to hold said latter member against rotation while said former member is free to rotate.

19. In a sheet dispensing device, two adjacent rolls of paper, a rotatable mandrel for each of said rolls, a casing for said rolls and mandrels, said mandrels and the respective rolls thereon being one above the other and in substantial vertical alignment, two co-extensive outlet apertures at the bottom of the casing positioned to receive therethrough the free end portions of sheets from said respective rolls, and dispensing means for permitting the alternate withdrawal from said rolls of sheets of predetermined length, said dispensing means comprising two adjacent rotatable coacting locking members, two shafts supporting said respective members, transmission means connecting said respective mountings for the rolls and said locking member shafts, whereby operative rotational movements of said mountings will cause operative rotational movements of said respective shafts, said shafts being operatively connected to said transmission means for rotation in opposite directions, means to hold one of said locking members against rotation while the other member is free to rotate, and means to hold said latter member against rotation while said former member is free to rotate.

20. In a sheet dispensing device, the combination according to claim 19, the sheet from one of said rolls extending down along the front of said casing to one of said outlet apertures, the sheet from the other of said rolls extending down along the rear of said casing to the other of said outlet operations, said rolls being rotatable in opposite directions.

21. In a sheet dispensing device, the combination according to claim 19, the sheets from both of said rolls extending downwardly along the same side of the casing to their respective outlet apertures, a guide plate spaced from the lower of said two rolls and positioned to receive thereagainst the sheet operatively extending down from the upper of said rolls, whereby said last-mentioned sheet is maintained in spaced relation to said lower roll.

22. In a sheet dispensing device, the combination according to claim 19, the sheets from both of said rolls extending downwardly along the same side of the casing to their respective outlet apertures, a guide plate spaced from the lower of said two rolls and positioned to receive thereagainst the sheet operatively extending down from the upper of said rolls, whereby said last-mentioned sheet is maintained in spaced relation to said lower roll, and a housing secured to the outside of said casing, said transmission means being disposed within said housing.

References Cited in the file of this patent

UNITED STATES PATENTS

| | | |
|---|---|---|
| 1,750,582 | Elliott | Mar. 11, 1930 |
| 2,708,375 | Layton et al. | May 17, 1955 |
| 2,720,122 | Layton | Oct. 11, 1955 |
| 2,738,934 | Dobkin | Mar. 20, 1956 |